United States Patent [19]

Yazawa

[11] Patent Number: 4,465,345
[45] Date of Patent: Aug. 14, 1984

[54] SMALL-SIZE TELESCOPIC LENS
[75] Inventor: Junichi Yazawa, Tokyo, Japan
[73] Assignee: Ricoh Company, Ltd., Tokyo, Japan
[21] Appl. No.: 416,589
[22] Filed: Sep. 10, 1982
[30] Foreign Application Priority Data
Sep. 21, 1981 [JP] Japan ................................ 56-149066
[51] Int. Cl.³ .......................... G02B 9/60; G02B 13/02
[52] U.S. Cl. ..................................................... 350/455
[58] Field of Search ......................................... 350/455
[56] References Cited
U.S. PATENT DOCUMENTS
3,502,394 3/1970 Kobayashi ........................... 350/455
3,966,307 6/1976 Tojyo ................................... 350/455
4,338,001 7/1982 Matsui ................................. 350/455
FOREIGN PATENT DOCUMENTS
47-8109 3/1972 Japan ................................... 350/455

Primary Examiner—John K. Corbin
Assistant Examiner—Scott J. Sugarman
Attorney, Agent, or Firm—Oblon, Fisher, Spivak, McClelland & Maier

[57] ABSTRACT

A small-size telescopic lens system with a brightness of 1:4, an angle of view of ±6°, and a telescopic ratio of about 0.8, which is constructed of front and back groups of lens elements, is disclosed. The first, second, third, fourth and fifth lens elements are aligned from the object side to the image side. The first, second and third lens elements make up the front group, while the fourth and fifth lens elements make up the back group.

The first lens element is a biconvex lens, the second lens element is a biconcave lens, the third lens element is a convex meniscus lens which is convex towards the object, the fourth lens element is a biconcave lens, and the fifth lens element is a biconvex lens.

4 Claims, 4 Drawing Figures

SMALL-SIZE TELESCOPIC LENS

BACKGROUND OF THE INVENTION

The present invention relates to a small-size telescopic lens system with a brightness of 1:4, and an angle of view of ±6°.

Conventionally, in a telescopic lens system with a brightness of 1:4, with a system composite focal distance in the 200-mm class, the telescopic ratio, i.e., (the distance from the first lens surface in the system to the image surface)/(the composite focal distance of the entire system), is greater than 0.85.

SUMMARY OF THE INVENTION

It is therefore a primary object of the present invention to provide a small-size telescopic lens system, with a brightness of 1:4, and an angle of view of ±6°, having a small telescopic ratio of about 0.8, that is to say, which is more compact than conventionally known lenses, and yet provides a higher degree of performance than such conventionally known lenses.

The small-size telescopic lens system according to the invention comprises 5 lens elements from the first to the fifth. The first lens element is situated on the object side, and the remaining lenses, the second to the fifth, are arranged in order toward the image side.

The first, second and third lens elements constitute the front group, while the fourth and fifth lens elements constitute the rear group.

The first lens element is a biconvex lens, the second lens element is a convex meniscus lens, the fourth lens element is a biconcave lens, and the fifth lens element is a biconvex lens. The convex surface of the third lens element, convex meniscus lens, is arranged so that it faces the object side.

The small-size telescopic lens system according to the invention is characterized by the following conditions being satisfied:

$0.9 < |f_F/f_R| < 1.2$                           (i)

$0.4 < l/f < 0.5$                                 (ii)

$0.6 < f_1/f < 0.8$                              (iii)

$-1.3 < f_2/f < -0.9$                          (iv)

$1.45 < (1/r_3 + 1/r_5) \times f_F < 2$            (v)

In the above, f is the focal distance of the entire system, $f_F$ is the composite focal distance of the front group, $f_R$ is the composite focal distance of the rear group, l is the interval between the principal points of the front group and rear group, $f_1$ is the focal distance of the first lens element, $f_2$ is the focal distance of the second lens element, $r_3$ is the radius of curvature of the third surface, i.e., the surface on the object side of the second lens element, and likewise, $r_5$ is the radius of curvature of the surface on the object side of the third lens element.

By completely satisfying the above five conditions, there can be provided a telescopic lens system which is small, capable of maintaining a good balance among all aberrations, which provides excellent performance.

DETAILED DESCRIPTION OF THE INVENTION

Figure 1:
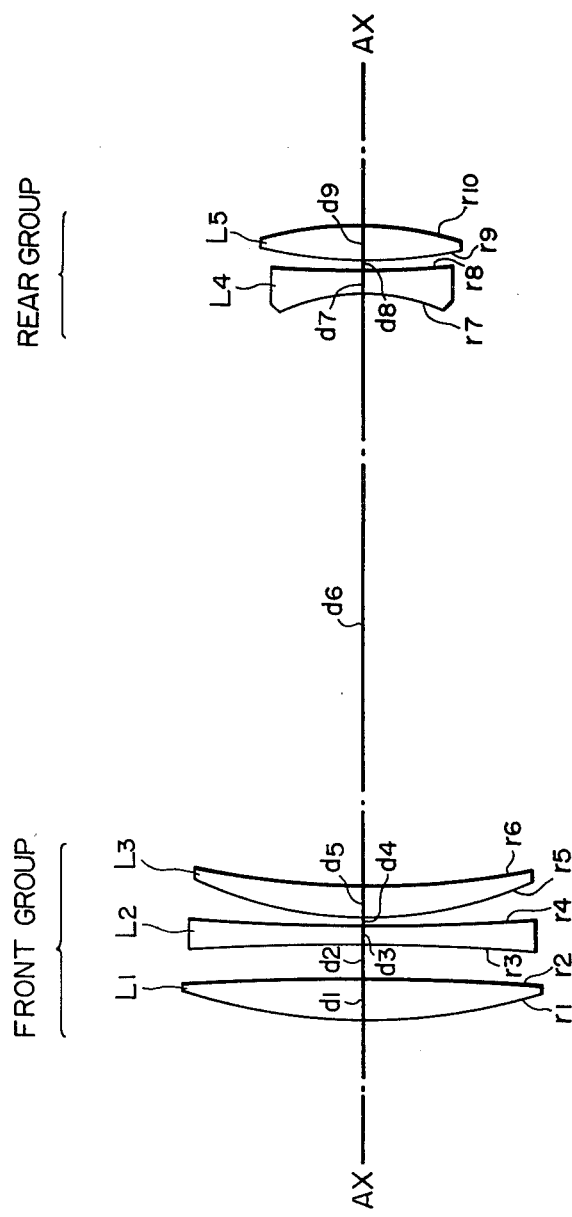
FIG. 1 is a longitudinal sectional view showing the configuration of the lens elements which constitute a small-size telescopic lens in accordance with the invention.

FIG. 1 shows the structure of a small-size telescopic lens system according to the invention. In FIG. 1, L1 indicates the first lens element, L2 to L5 indicate the second to fifth lens elements, respectively, and AX is the optical axis. A symbol $r_i$ (where i=1 to 10) indicates the radius of curvature of the i-th lens surface, which is counted in consecutive order from the object side, i.e., the left-hand side of FIG. 1. A symbol $d_i$ (where i=1 to 9) indicates the surface interval distance of the i-th lens, counting from the object side.

The first lens element L1 is a biconvex lens, the second element L2 is a biconcave lens, and the third element L3 is a convex meniscus lens. The third element L3 is oriented with its convex surface directed towards the object side. The elements L1, L2 and L3 constitute the front group. The fourth element L4 is a biconcave lens, and the fifth element L5 is a biconvex lens. The elements L4 and L5 constitute the rear group.

The small-size telescopic lens system according to the invention must satisfy the previously outlined five conditions. An explanation of these five conditions is given below.

Conditions (i) and (ii) are required to fix an appropriate distribution of lens power among the front and rear groups in order to maintain a good balance among all aberrations while maintaining a small telescopic ratio. In other words, when the upper limit of condition (i) is exceeded, the absolute value of the Petzval sum increases, the curvature of the image surface increases, and the spherical aberrations are under-corrected. Especially, if the upper limit of condition (ii) is exceeded, the telescopic ratio becomes large, and in addition the under-correction of the spherical aberrations becomes pronounced. Also, when the lower limit of condition (i) is exceeded, the telescopic ratio decreases, the spherical aberrations tend to be over-corrected, and the Petzval sum also becomes positive, which is an undesirable condition. Furthermore, if the lower limit of condition (ii) is exceeded, the over-correction of the spherical aberrations becomes pronounced.

Conditions (iii) and (iv) together, in the same way as conditions (i) and (ii), are to maintain a good balance among the telescopic ratio and all the aberrations. Condition (iii) is to establish the range of the focal distance for the lens element $L_1$, while condition (iv) establishes the range of the focal distance for the lens element $L_2$.

When the upper limits of conditions (iii) and (iv) are exceeded, the telescopic ratio becomes large, and in addition the coma aberration, the magnification and color aberrations increase. With respect to the coma aberrations, when the image height is taken in a positive direction (the light beam angle of incidence in a negative direction), the lower side of the bundle of rays outside the optical axis tends to be under-corrected, the divergent trend on the image surface increases, and halos and others are generated. In addition, with respect to the magnification and color aberrations, in the case of short wavelength rays, the aberrations in the marginal direction increases, while in the case of long wavelength rays, the aberrations in the direction of the optical axis increase.

If the upper limit of condition (iv) is exceeded, the curvature becomes large in the direction of the image surface side with respect to astigmatism, especially in the meridional plane. In addition, the color aberrations on the optical axis are over-corrected in the short wavelength rays, and are under-corrected in the long wavelength rays.

When the lower limits of conditions (iii) and (iv) are exceeded, distortion, coma aberrations, and magnification and color aberrations all increase. Distortion usually has a positive tendency in a telescopic lens, but when the lower limits of conditions (iii) and (iv) are exceeded, this positive tendency becomes conspicuously greater. In the case of coma aberrations, the lower-side rays of the bundle of rays outside the optical axis are over-corrected, and the convergent tendency becomes excessive at the image surface. The amount of magnification and color aberration also becomes larger in the direction of the optical axis in the case of the short wavelength rays and in the marginal direction in the case of the long wavelength rays.

If the lower limit of condition (iv) is exceeded, astigmatism and color aberrations on the optical axis increase even further. For astigmatism especially, the curvature in the direction of the object side becomes large in the meridional plane.

Condition (v) is to maintain spherical aberrations within reasonable limits. The fifth lens surface (the lens surface which has an $r_5$ radius of curvature), negates the over-corrected spherical aberrations which take place at the third lens surface (with a radius of curvature of $r_3$). When the upper limit of condition (v) is exceeded, the power of the fifth lens surface becomes larger than the power of the third lens surface, and the spherical aberrations are under-corrected. When the lower limit of condition (v) is exceeded, the power of third lens surface becomes larger than the power of the fifth lens surface, resulting in over-correction of the spherical aberrations.

As outlined above, when conditions (i) through (v) are fulfilled, it is possible to get a small-size telescopic lens with excellent performance.

THE PREFERRED EMBODIMENTS

Three embodiments of the invention are described below. In each of these exmbodiments w represents the angle of view, $n_i$ is the refractive index of the d line of the glass in the i-th lens, and $v_i$ is the Abbe's number of the i-th lens.

EXAMPLE 1

$f = 100$  Brightness: 1:4  $w = \pm 6.3°$

| | | | | |
|---|---|---|---|---|
| $r_1 =$ | 49.145 | $d_1 = 3.17$ | $n_1 = 1.49831$ | $v_1 = 65$ |
| $r_2 =$ | −139.858 | $d_2 = 1.45$ | | |
| $r_3 =$ | −102.785 | $d_3 = 1.3$ | $n_2 = 1.78472$ | $v_2 = 25.7$ |
| $r_4 =$ | 464.254 | $d_4 = 0.48$ | | |
| $r_5 =$ | 27.916 | $d_5 = 2.09$ | $n_3 = 1.51633$ | $v_3 = 64.2$ |
| $r_6 =$ | 73.843 | $d_6 = 41.29$ | | |
| $r_7 =$ | −13.799 | $d_7 = 1.64$ | $n_4 = 1.65844$ | $v_4 = 50.9$ |
| $r_8 =$ | 55.915 | $d_8 = 0.74$ | | |
| $r_9 =$ | 43.303 | $d_9 = 1.73$ | $n_5 = 1.59551$ | $v_5 = 39.2$ |
| $r_{10} =$ | −24.382 | | | |

$\Sigma d = 53.89$
Back focus: = 25.926
Telescopic ratio = 0.798

Figure 2:
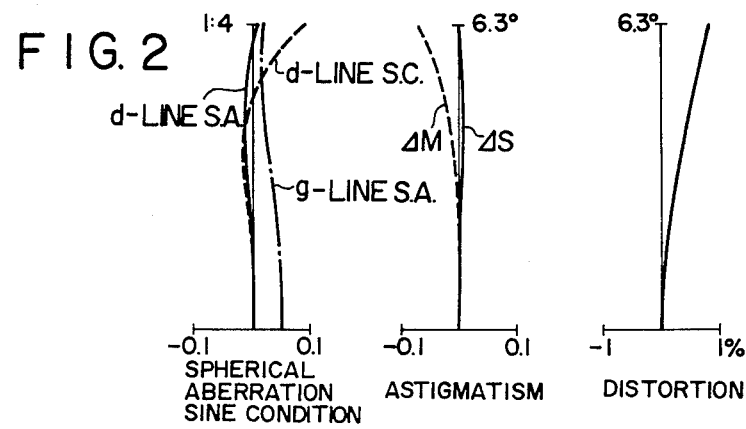
FIG. 2 is a diagram showing various aberration curves of a first embodiment of the invention.

$|f_F/f_R| = |63.056/-58.203| = 1.083$
$l/f = 41.553/100 = 0.416$
$f_1/f = 73.388/100 = 0.734$
$f_2/f = -107.132/100 = -1.071$
$(1/r_3 + 1/r_5) \times f_F = 1.645$ FIG. 2 is a diagram showing the aberrations of this example.

EXAMPLE 2

$f = 100$  Brightness: 1:4  $w = \pm 6.3°$

| | | | | |
|---|---|---|---|---|
| $r_1 =$ | 49.848 | $d_1 = 3.64$ | $n_1 = 1.49831$ | $v_1 = 65$ |
| $r_2 =$ | −122.53 | $d_2 = 1.92$ | | |
| $r_3 =$ | −95.49 | $d_3 = 1.04$ | $n_2 = 1.78472$ | $v_2 = 25.7$ |
| $r_4 =$ | 635.883 | $d_4 = 0.11$ | | |
| $r_5 =$ | 27.509 | $d_5 = 2.34$ | $n_3 = 1.51633$ | $v_3 = 64.2$ |
| $r_6 =$ | 66.751 | $d_6 = 41.29$ | | |
| $r_7 =$ | −13.666 | $d_7 = 1.22$ | $n_4 = 1.65844$ | $v_4 = 50.9$ |
| $r_8 =$ | 58.83 | $d_8 = 0.95$ | | |
| $r_9 =$ | 42.631 | $d_9 = 1.59$ | $n_5 = 1.59551$ | $v_5 = 39.2$ |
| $r_{10} =$ | −23.602 | | | |

Figure 3:
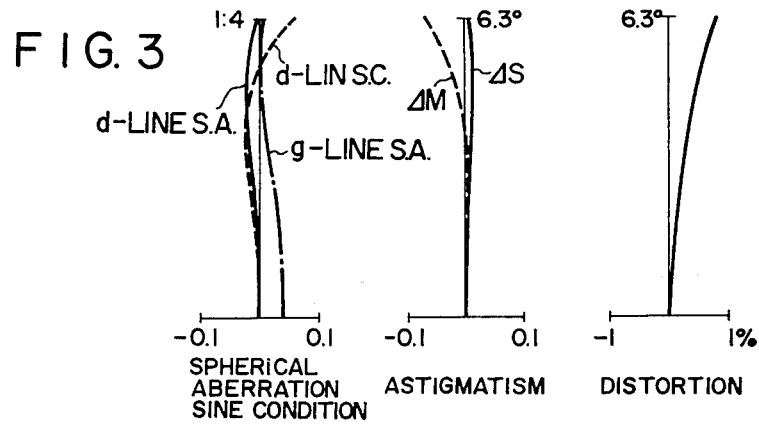
FIG. 3 is a diagram showing various aberration curves of a second embodiment of the invention.

$\Sigma d = 54.1$
Back focus = 25.584
Telescopic ratio = 0.797
$|f_F/f_R| = |63.709/-59.365| = 1.073$
$l/f = 42.165/100 = 0.422$
$f_1/f = 71.609/100 = 0.716$
$f_2/f = -105.733/100 = -1.057$
$(1/r_3 + 1/r_5) \times f_F = 1.649$ FIG. 3 is a diagram showing the aberrations of this example.

EXAMPLE 3

$f = 100$  Brightness: 1:4  $w = \pm 6.3°$

| | | | | |
|---|---|---|---|---|
| $r_1 =$ | 40.08 | $d_1 = 3.12$ | $n_1 = 1.48749$ | $v_1 = 70.2$ |
| $r_2 =$ | −177.113 | $d_2 = 2.46$ | | |
| $r_3 =$ | −119.42 | $d_3 = 1.3$ | $n_2 = 1.78472$ | $v_2 = 25.7$ |
| $r_4 =$ | 449.086 | $d_4 = 0.24$ | | |
| $r_5 =$ | 27.817 | $d_5 = 2.2$ | $n_3 = 1.48749$ | $v_3 = 70.2$ |
| $r_6 =$ | 55.68 | $d_6 = 41.49$ | | |
| $r_7 =$ | −13.564 | $d_7 = 1.47$ | $n_4 = 1.65844$ | $v_4 = 50.9$ |
| $r_8 =$ | 70.514 | $d_8 = 0.76$ | | |
| $r_9 =$ | 44.714 | $d_9 = 2.43$ | $n_5 = 1.59551$ | $v_5 = 39.2$ |
| $r_{10} =$ | −24.89 | | | |

Figure 4:
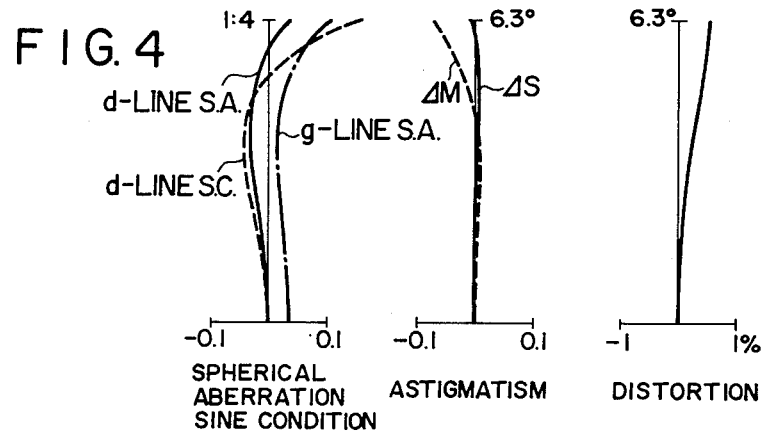
FIG. 4 is a diagram showing various aberration curves of a third embodiment of the invention.

$\Sigma d = 55.27$
Back focus = 24.528
Telescopic ratio = 0.798
$|f_F/f_R| = |64.468/-61.766| = 1.044$
$l/f = 42.522/100 = 0.425$
$f_1/f = 67.362/100 = 0.674$
$f_2/f = -120.094/100 = -1.201$
$(1/r_3 + 1/r_5) \times f_F = 1.778$ FIG. 4 is a diagram showing the aberrations of this embodiment.

What is claimed is:

1. A small-size telescopic lens system consisting of five lens elements arranged so that a front group is located on the object side and a rear group is located on the image side, said front group, from the object side, comprising a biconvex lens which is the first lens element, a biconcave lens which is the second lens element, and a convex meniscus lens which is the third lens element and is convex toward the object side; and said rear group comprising a biconcave lens, which is the fourth lens element, on the object side, and a biconvex lens, which is the fifth lens element, on the image side; and satisfying the following five conditions:

$$0.9 < |f_F/f_R| < 1.2 \qquad (i)$$

$$0.4 < l/f < 0.5 \quad \text{(ii)}$$

$$0.6 < f_1/f < 0.8 \quad \text{(iii)}$$

$$-1.3 < f_2/f < -0.9 \quad \text{(iv)}$$

$$1.45 < (1/r_3 + 1/r_5) \times f_F < 2 \quad \text{(v)}$$

where f is the composite focal distance of the entire system; $f_F$ is the composite focal distance of the front group, $f_R$ is the composite focal distance to the rear group, l is the interval between the principal points of the front group and the rear group, $f_1$ is the focal distance of the first lens element, $f_2$ is the focal distance of the second lens element, $r_3$ is the radius of curvature of the lens surface on the object side of the second lens element, and $r_5$ is the radius of curvature of the lens surface on the object side of the third lens element.

2. A small-size telescropic lens system as in claim 1, wherein:

| | f = 100 | Brightness: 1:4 | w = ± 6.3° | |
|---|---|---|---|---|
| $r_1$ = | 49.145 | $d_1$ = 3.17 | $n_1$ = 1.49831 | $v_1$ = 65 |
| $r_2$ = | −139.858 | $d_2$ = 1.45 | | |
| $r_3$ = | −102.785 | $d_3$ = 1.3 | $n_2$ = 1.78472 | $v_2$ = 25.7 |
| $r_4$ = | 464.254 | $d_4$ = 0.48 | | |
| $r_5$ = | 27.916 | $d_5$ = 2.09 | $n_3$ = 1.51633 | $v_3$ = 64.2 |
| $r_6$ = | 73.843 | $d_6$ = 41.29 | | |
| $r_7$ = | −13.799 | $d_7$ = 1.64 | $n_4$ = 1.65844 | $v_4$ = 50.9 |
| $r_8$ = | 55.915 | $d_8$ = 0.74 | | |
| $r_9$ = | 43.303 | $d_9$ = 1.73 | $n_5$ = 1.59551 | $v_5$ = 39.2 |
| $r_{10}$ = | −24.382 | | | | where $r_i$ (where i=1 to 10) is the radius of the object side, $d_i$ (where i=1 to 9) is the surface interval distance of the i-th lens surface from the object side, and $n_1$ and $v_i$ (where i=1 to 5) are respectively the refractive index and the Abbe's number of the i-th lens element from the object side, and w is the angle of view.

3. A small-size telescopic lens system as in claim 1, wherein:

| | f = 100, | Brightness: 1:4 | w = ± 6.3° | |
|---|---|---|---|---|
| $r_1$ = | 49.848 | $d_1$ = 3.64 | $n_1$ = 1.49831 | $v_1$ = 65 |
| $r_2$ = | −122.53 | $d_2$ = 1.92 | | |
| $r_3$ = | −95.49 | $d_3$ = 1.04 | $n_2$ = 1.78472 | $v_2$ = 25.7 |
| $r_4$ = | 635.883 | $d_4$ = 0.11 | | |
| $r_5$ = | 27.509 | $d_5$ = 2.34 | $n_3$ = 1.51633 | $v_3$ = 64.2 |
| $r_6$ = | 66.751 | $d_6$ = 41.29 | | |
| $r_7$ = | −13.666 | $d_7$ = 1.22 | $n_4$ = 1.65844 | $v_4$ = 50.9 |
| $r_8$ = | 53.83 | $d_8$ = 0.95 | | |
| $r_9$ = | 42.631 | $d_9$ = 1.59 | $n_5$ = 1.59551 | $v_5$ = 39.2 |
| $r_{10}$ = | −23.602 | | | | where $r_i$ (where i=1 to 10) is the radius of the object side, $d_i$ (where i=1 to 9) is the surface interval distance of the i-th lens surface from the object side, and $n_i$ and $v_i$ (where i=1 to 5) are respectively the refractive index and the Abbe's number of the i-th lens element from the object side, and w is the angle of view.

4. A small-size telescopic lens system as in claim 1, wherein:

| | f = 100, | Brightness:1:4 | w = ± 6.3° | |
|---|---|---|---|---|
| $r_1$ = | 40.08 | $d_1$ = 3.12 | $n_1$ = 1.48749 | $v_1$ = 70.2 |
| $r_2$ = | −177.113 | $d_2$ = 2.46 | | |
| $r_3$ = | −119.42 | $d_3$ = 1.3 | $n_2$ = 1.78472 | $v_2$ = 25.7 |
| $r_4$ = | 449.086 | $d_4$ = 0.24 | | |
| $r_5$ = | 27.817 | $d_5$ = 2.2 | $n_3$ = 1.48749 | $v_3$ = 70.2 |
| $r_6$ = | 55.68 | $d_6$ = 41.49 | | |
| $r_7$ = | −13.564 | $d_7$ = 1.47 | $n_4$ = 1.65844 | $v_4$ = 50.9 |
| $r_8$ = | 70.514 | $d_8$ = 0.76 | | |
| $r_9$ = | 44.714 | $d_9$ = 2.43 | $n_5$ = 1.59551 | $v_5$ = 39.2 |
| $r_{10}$ = | −24.89 | | | | where $r_i$ (where i=1 to 10) is the radius of the object side, $d_i$ (where i=1 to 9) is the surface interval distance of the i-th lens surface from the object side, and $n_i$ and $v_i$ (where i=1 to 5) are respectively the refractive index and the Abbe's number of the i-th lens element from the object side, and w is the angle of view.

* * * * *